(12) United States Patent
Tyler

(10) Patent No.: US 10,798,783 B2
(45) Date of Patent: Oct. 6, 2020

(54) ADDITIVELY MANUFACTURED COMPOSITE HEATER

(71) Applicant: CC3D LLC, Coeur d'Alene, ID (US)

(72) Inventor: Kenneth Lyle Tyler, Coeur d'Alene, ID (US)

(73) Assignee: Continuous Composites Inc., Coeur d'Alene, ID (US)

(*) Notice: Subject to any disclaimer, the term of this patent is extended or adjusted under 35 U.S.C. 154(b) by 347 days.

(21) Appl. No.: 15/889,283

(22) Filed: Feb. 6, 2018

(65) Prior Publication Data

US 2018/0235030 A1 Aug. 16, 2018

Related U.S. Application Data

(60) Provisional application No. 62/459,398, filed on Feb. 15, 2017.

(51) Int. Cl.
*H05B 3/28* (2006.01)
*B33Y 70/00* (2020.01)
(Continued)

(52) U.S. Cl.
CPC .......... *H05B 3/286* (2013.01); *B29C 64/165* (2017.08); *B29C 64/209* (2017.08);
(Continued)

(58) Field of Classification Search
CPC . H05B 3/286; H05B 3/36; H05B 3/48; B33Y 80/00; B33Y 70/00; B29K 2101/10; B29C 64/165; B29C 70/885; B29C 70/384; B29C 70/207; B29C 64/236; B29C 64/209; B29C 64/232; B29C 64/291; B29C 64/393
(Continued)

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 2589481 B1 1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Jennifer C Chiang
(74) *Attorney, Agent, or Firm* — Ryan C. Stockett

(57) ABSTRACT

A composite heater may include a base additively manufactured from a first matrix material, and a heating element additively manufactured adjacent the base from a second matrix material and an electrically and thermally conductive fiber that is at least partially encased in the second matrix material. The composite heater may also include a control mechanism configured to selectively complete a circuit between a power supply and the electrically and thermally conductive fiber.

20 Claims, 2 Drawing Sheets

(51) Int. Cl.

| | | |
|---|---|---|
| *B29C 64/165* | (2017.01) | |
| *B29C 70/88* | (2006.01) | |
| *B33Y 10/00* | (2015.01) | |
| *B33Y 30/00* | (2015.01) | |
| *B29C 64/232* | (2017.01) | |
| *B29C 64/245* | (2017.01) | |
| *B29C 64/209* | (2017.01) | |
| *B29C 64/236* | (2017.01) | |
| *B29C 64/241* | (2017.01) | |
| *B29C 70/20* | (2006.01) | |
| *B29C 70/38* | (2006.01) | |
| *C01B 32/194* | (2017.01) | |
| *B29C 64/291* | (2017.01) | |
| *B29C 64/393* | (2017.01) | |
| *B33Y 80/00* | (2015.01) | |
| *B29L 31/00* | (2006.01) | |
| *B29K 101/10* | (2006.01) | |

(52) U.S. Cl.
CPC ......... *B29C 64/232* (2017.08); *B29C 64/236* (2017.08); *B29C 64/241* (2017.08); *B29C 64/245* (2017.08); *B29C 64/291* (2017.08); *B29C 64/393* (2017.08); *B29C 70/207* (2013.01); *B29C 70/384* (2013.01); *B29C 70/885* (2013.01); *B33Y 10/00* (2014.12); *B33Y 30/00* (2014.12); *B33Y 70/00* (2014.12); *C01B 32/194* (2017.08); *B29K 2101/10* (2013.01); *B29K 2995/0007* (2013.01); *B29L 2031/753* (2013.01); *B29L 2031/779* (2013.01); *B33Y 80/00* (2014.12); *H05B 2203/011* (2013.01); *H05B 2203/014* (2013.01)

(58) Field of Classification Search
USPC ........................................................ 219/544
See application file for complete search history.

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,296,335 A | 3/1994 | Thomas et al. | |
| 5,340,433 A | 8/1994 | Crump | |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,459,069 B1 | 10/2002 | Rabinovich | |
| 6,501,554 B1 | 12/2002 | Hackney et al. | |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 10,449,731 B2 * | 10/2019 | Deaville | B29C 70/386 |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 | 4/2009 | Oldani | |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2015/0136455 A1 | 5/2015 | Fleming | |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0263806 A1 | 9/2016 | Gardiner | |
| 2016/0263822 A1 | 9/2016 | Boyd | |
| 2016/0263823 A1 | 9/2016 | Espiau et al. | |
| 2016/0271876 A1 | 9/2016 | Lower | |
| 2016/0297104 A1 | 10/2016 | Guillemette et al. | |
| 2016/0311165 A1 | 10/2016 | Mark et al. | |
| 2016/0325491 A1 | 11/2016 | Sweeney et al. | |
| 2016/0332369 A1 | 11/2016 | Shah et al. | |
| 2016/0339633 A1 | 11/2016 | Stolyarov et al. | |
| 2016/0346998 A1 | 12/2016 | Mark et al. | |
| 2016/0361869 A1 | 12/2016 | Mark et al. | |
| 2016/0368213 A1 | 12/2016 | Mark | |
| 2016/0368255 A1 | 12/2016 | Witte et al. | |
| 2017/0007359 A1 | 1/2017 | Kopelman et al. | |
| 2017/0007360 A1 | 1/2017 | Kopelman et al. | |

(56) References Cited

U.S. PATENT DOCUMENTS

| | | |
|---|---|---|
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0250491 A1* | 9/2018 | Row ................ A61M 16/1075 |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/ Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

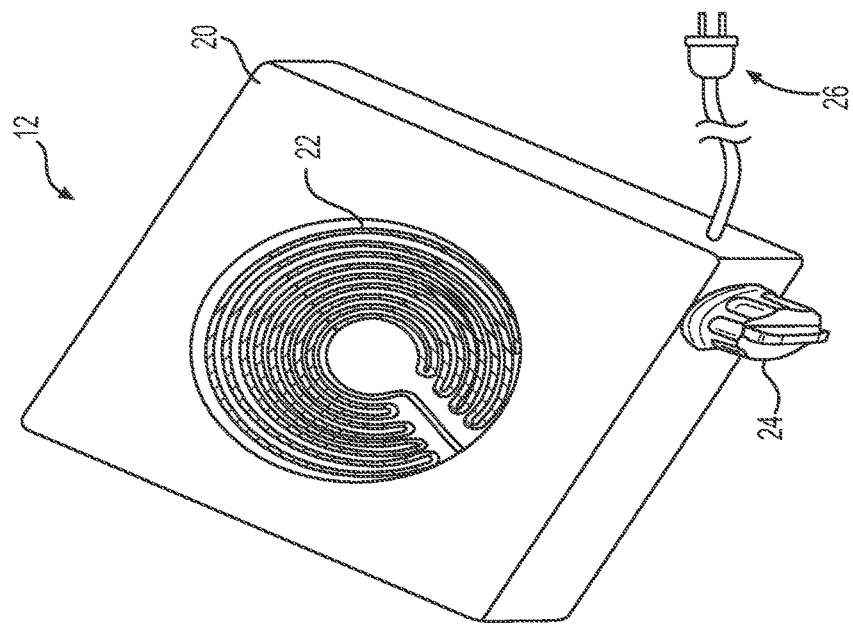
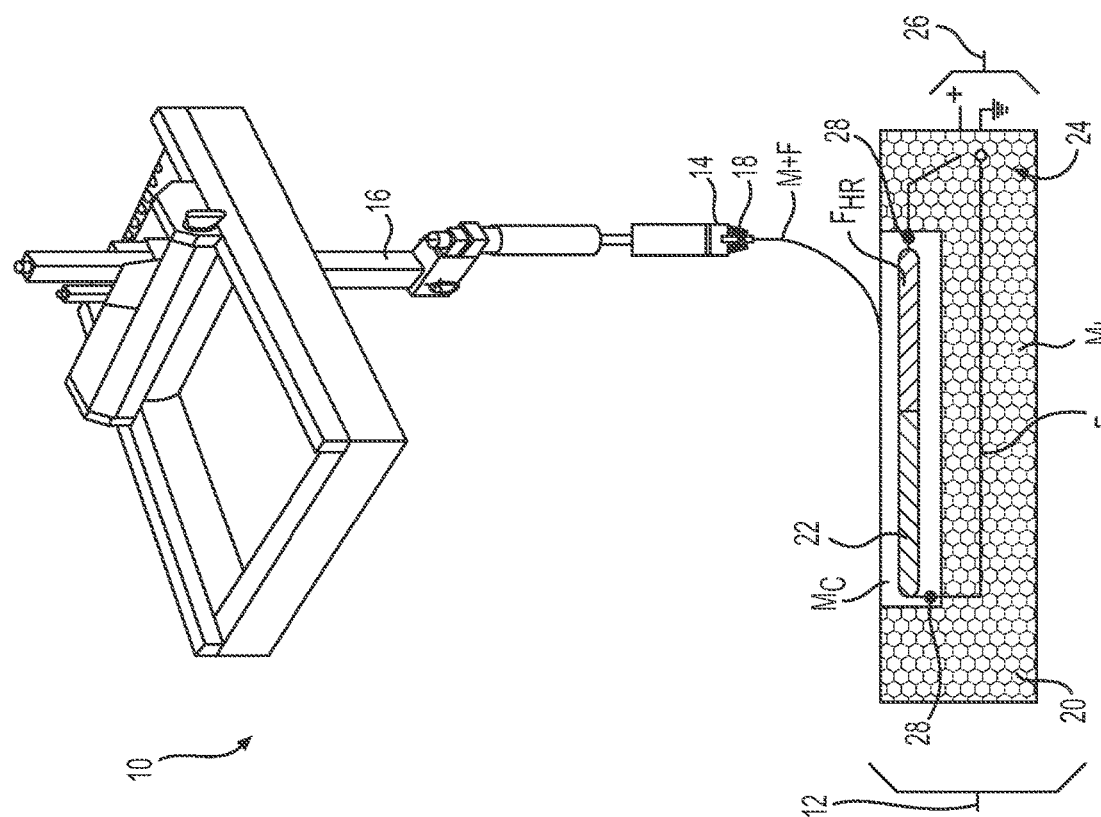

ADDITIVELY MANUFACTURED COMPOSITE HEATER

RELATED APPLICATIONS

This application is based on and claims the benefit of priority from U.S. Provisional Application No. 62/459,398 that was filed on Feb. 15, 2017, the contents of which are expressly incorporated herein by reference.

TECHNICAL FIELD

The present disclosure relates generally to a heater and, more particularly, to composite heater fabricated through additive manufacturing.

BACKGROUND

Conventional electric heaters are used in many different applications, including residential applications (e.g., cooking, washing, space-warming, etc.) and industrial applications (e.g., de-icing, mold-forming, metal-hardening, etc.). In these applications, a current is generated within a conductive circuit having elevated resistance. The current can be generated through direct application of the current or through induced application (e.g., via eddy currents induced by magnetic fields). The resistive nature of the circuit causes the circuit to heat up during transmission of the current.

The circuit of a conventional electric heater generally includes one or more electrodes that can be bent to a desired shape, a power source that generates the current, and a switch that selectively allows the current to flow through the electrodes (e.g., based on a desired temperature and/or a sensed actual temperature). The electrode(s) can be housed within an insulator that provides for directional heating, if desired.

Although suitable for many applications, conventional electric heaters can also be problematic. For example, conventional electric heaters can be bulky, heavy, and difficult to package in a manner that lends itself to efficient and convenient thermal transfer. In addition, conventional electric heaters may produce heat that is uneven, imprecisely controlled, and/or mismatched with required specifications. Further, conventional electric heaters may lack flexibility required to accommodate changing applications.

The disclosed heater and additive manufacturing system are directed to overcoming one or more of the problems set forth above and/or other problems of the prior art.

SUMMARY

In one aspect, the present disclosure is directed to a heating element. The heating element may include a matrix material, and an electrically and thermally conductive fiber that is at least partially encased in the matrix material. The heating element may also include an electrically conductive fiber that extends into the matrix material and connects with the electrically and thermally conductive fiber. A resistance of the electrically and thermally conductive fiber may be higher than a resistance of the electrically conductive fiber.

In another aspect, the present disclosure is directed to a composite heater. The composite heater may include a base additively manufactured from a first matrix material, and a heating element additively manufactured adjacent the base from a second matrix material and an electrically and thermally conductive fiber that is at least partially encased in the second matrix material. The composite heater may also include a control mechanism configured to selectively complete a circuit between a power supply and the electrically and thermally conductive fiber.

BRIEF DESCRIPTION OF THE DRAWINGS

FIG. 1 is a diagrammatic illustration of an exemplary system for manufacturing a composite heater;

FIG. 2 is an isometric illustration of an exemplary composite heater that can be manufactured utilizing the system of FIG. 1.

DETAILED DESCRIPTION

Figure 3:
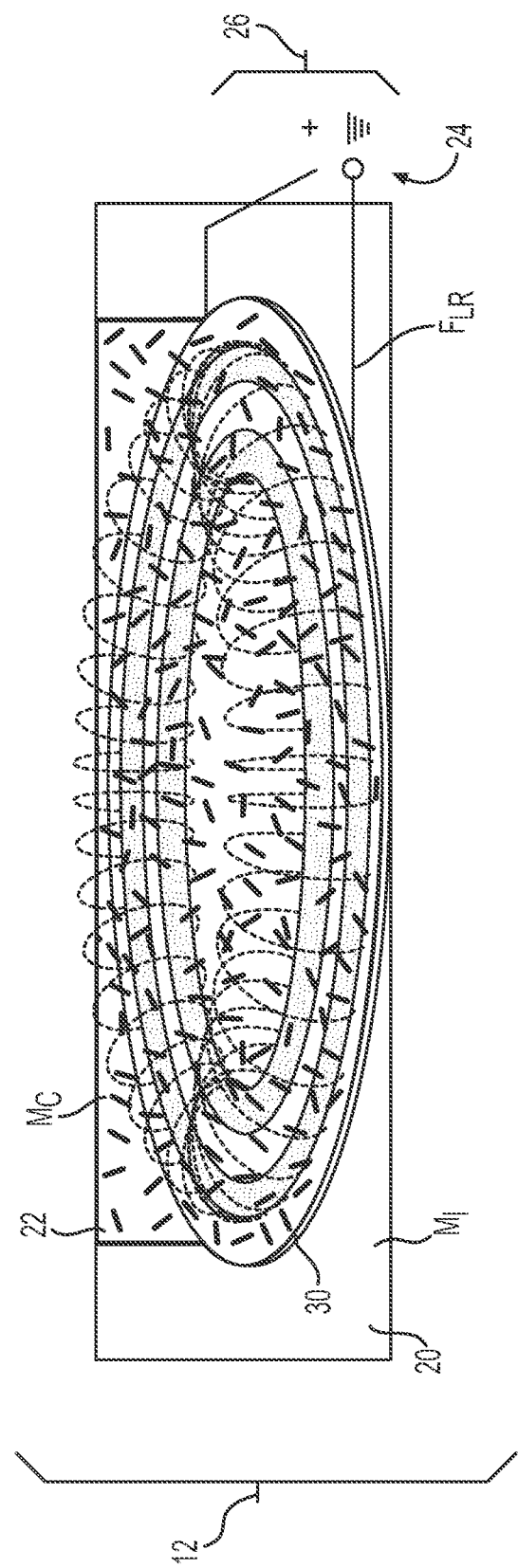
FIG. 3 is a cross-sectional illustration of another exemplary composite heater that can be manufactured utilizing the system of FIG. 1.

FIG. 1 illustrates an exemplary system 10 for additively manufacturing a heater 12. System 10 may manufacture heater 12 from a composite material (e.g., a material having a matrix M and at least one continuous fiber F) using a pultrusion and/or extrusion process. System 10 may include one or more heads 14 coupled to a support 16 (e.g., to a robotic arm, to a gantry, to a hybrid gantry-arm, etc.) that is capable of moving head(s) 16 in multiple directions during discharge of the composite material, such that heater 12 is three-dimensional. Such a head is disclosed, for example, in U.S. patent application Ser. Nos. 15/130,412 and 15/130,207, all of which are incorporated herein in their entireties by reference.

Head 14 may be configured to receive or otherwise contain the matrix material. The matrix material may include any type of liquid resin (e.g., a zero-volatile organic compound resin) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the pressure of the matrix material inside of head 14 may be generated by an external device (e.g., an extruder or another type of pump) that is fluidly connected to head 14 via corresponding conduits (not shown). In another embodiment, however, the pressure may be generated completely inside of head 14 by a similar type of device and/or simply be the result of gravity acting on the matrix material. In some instances, the matrix material inside head 14 may need to be kept cool and/or dark, in order to inhibit premature curing; while in other instances, the matrix material may need to be kept warm for the same reason. In either situation, head 14 may be specially configured (e.g., insulated, chilled, and/or warmed) to provide for these needs.

The matrix material stored inside head 14 may be used to coat any number of continuous fibers and, together with the fibers make up portions of heater 12. The fibers may include single strands, a tow or roving of several strands, or a weave of many strands. The strands may include, for example, carbon fibers, vegetable fibers, wood fibers, mineral fibers, glass fibers, metallic wires, ceramic fibers, basalt fibers, etc. The fibers may be coated with the matrix material while the fibers are inside head 14, while the fibers are being passed to head 14, and/or while the fibers are discharging from head 14, as desired. In some embodiments, a filler material (e.g., chopped fibers or particles of fibers) may be mixed with the matrix material before and/or after the matrix material coats the fibers. The matrix material, the dry fibers, fibers already coated with the matrix material, and/or the filler may be transported into head 14 in any manner apparent to one skilled in the art. The matrix-coated fibers may then pass through one or more circular orifices, rectangular orifices, triangular orifices, or orifices of another curved or polygonal shape, where the fibers are pressed together and/or the matrix is caused to cure by way of one or more cure enhancers 18.

As described above, the disclosed additive manufacturing processes can be an extrusion or pultrusion processes. For example, extrusion may occur when the liquid matrix and the associated continuous fibers are pushed from head 14 during the movement of support 16. Pultrusion may occur after a length of matrix-coated fiber is connected to an anchor (not shown) and cured, followed by movement of head 14 away from the anchor. The movement of head 14 away from the anchor may cause the fiber to be pulled from head 14, along with the coating of the matrix material.

In some embodiments, pultrusion may be selectively implemented to generate tension in the fibers that make up heater 12 and that remains after curing. In particular, as the fibers are being pulled from head 14, the fibers may be caused to stretch. This stretching may create tension within the fibers. As long as the matrix surrounding the fibers cures and hardens while the fibers are stretched, at least some of this tension may remain in the fibers and function to increase a strength of the resulting composite structure.

Structures fabricated via conventional pultrusion methods may have increased strength in only a single direction (e.g., in the single direction in which fibers were pulled through the corresponding die prior to resin impregnation and curing). However, in the disclosed embodiment, the increased strength in heater 12 caused by residual tension within the corresponding fibers may be realized in the axial direction of each of the fibers. And because each fiber could be pulled in a different direction during discharge from head 14, the tension-related strength increase may be realized in multiple (e.g., innumerable) different directions.

Structures fabricated via conventional pultrusion methods may have strength increased to only a single level (e.g., to a level proportionate to an amount in which the fibers were stretched by a pulling machine prior to resin impregnation and curing). However, in the disclosed embodiment, because the matrix surrounding each fiber may be cured and harden almost immediately upon discharge, the force pulling on the fiber may be continuously varied along the length of the fiber, such that different segments of the same fiber are stretched by different amounts. Accordingly, the residual tensile stress induced within each of the different segments of each different fiber may also vary, resulting in a variable strength within different areas of heater 12. This may be beneficial in variably loaded areas of heater 12.

Heater 12 may include, among other things, a base 20, one or more heating elements 22, and a control mechanism 24. Each heating element 22 may be at least partially received within and/or supported by base 20, and control mechanism 24 may be used to regulate current flow from a power source 26 through heating element(s) 22. As will be explained in more detail below, the current flow through heating element(s) 22 may be directly generated and/or indirectly induced, as desired.

Base 20 may be discharged (e.g., via one or more separate tracks of material) from head 14 to function as a holder and/or insulator for heating element(s) 22. Base 20 may generally be located at once side (e.g., gravitationally below) of heating element(s) 22 and, in some embodiments protrude upwards around sides of heating element(s) 22. For example, base 20 may have one or more recesses that receive heating element(s) 22, such that a limited number of faces (e.g., only upward directed faces) of heating element(s) 22 are exposed. In this manner, the heat generated by heating element(s) 22 may be focused in one or more desired directions.

In some embodiments, the matrix $M_I$ of base 20 may include a resin having low-thermal conductivity properties, such that a limited amount of heat generated by heating element(s) 22 passes through base 20. In one embodiment, air bubbles and/or voids may purposely be created within the resin to enhance the thermal conductivity properties, if desired. For example, the matrix $M_I$, when cured, may have a porosity greater than about 60%, with a higher porosity providing a more thermal insulation. The resin making up base 20 may be stiff or flexible after exposure to cure energy by cure enhancers 18, which may allow for fixed or moveable applications (i.e., without causing damage to heater 12).

It is contemplated that matrix $M_I$ of base 20 may be used to coat only structural-type continuous fibers, a combination of continuous and chopped fibers, only chopped fibers, or no fibers at all. For example, base 20 may be comprised of only the insulative matrix $M_I$ in some embodiments. In embodiments where base 20 does include structural continuous and/or chopped fibers, the fibers may be themselves also be insulative (e.g., glass fibers or aramids), if desired. In addition, the matrix-coated fibers may be arranged to create voids or air pockets that provide additional thermal insulation. For example, the fibers of base 20 may be discharged into a lattice structure (e.g., honeycomb shapes—shown in FIG. 1) that remains after curing of the associated matrix $M_I$.

Heating element 22 may be discharged from head 14 at the same time as or after discharge of base 20. For example, heating element 22 may be discharged into one or more of the recesses formed within base 20. The matrix $M_C$ of heating element 22 may include a resin having relatively high-thermal conductivity (e.g., when compared to the matrix $M_I$ of base 20). For example, the matrix $M_C$ may have a reduced porosity (e.g., a porosity less than about 60%) and/or include metallic particles, carbon particles, metal-coated particles (e.g., nickel coated carbon particles) and/or other heat-conducting particles suspended therein. In addition, the fibers $F_{HR}$ of heating element 22 may be electrically and thermally conductive (e.g., carbon fibers, metallic wires such as nichrome wires, metal-coated fibers, etc.) and function both as structural-type elements and as electrodes of the circuit described above. The fibers $F_{HR}$, while electrically conductive, may have elevated resistance, such that the circuit flowing therethrough generates heat. It should be noted that the electrically conductive fibers utilized as heating element(s) 22 may be discharged in any desired pattern, spatial density, and location. For example, the fibers may be oriented in a spiraling pattern within a common plane (shown in FIGS. 1 and 2), as coils, as elongated electrodes, as woven grids, and/or as heterogeneous or homogeneous mixtures of suspended particles (shown in FIG. 3).

In some applications, leads of a different electrically conductive material (e.g., a material having a lower electrical resistance, such as aluminum, copper, etc.) may extend from control mechanism 24, through base 20, to the fibers $F_{HR}$ of heating element 22. In these application, the leads may be joined to the fibers $F_{HR}$ of heating element 22 mechanically, chemically, and/or via an adhesive. For example, the fibers may be twisted together, crimped together, soldered together, and/or glued together (e.g., with a solder paste), if desired. This joining of fibers may be implemented automatically by system 10 (e.g., by dynamically swapping out matrixes supplied to head 14 and/or by dynamically splicing the fibers via an internal splicer mechanism—not shown) as head 14 crosses boundaries between the components of heater 12, or manually during pauses between fabrication phases.

It is contemplated that any number of circuits of different shapes, sizes and/or materials may be fabricated within heater 12. For example, multiple completely separate circuits can be fabricated that have the same or different output capabilities. Alternatively or additionally, as shown in FIG. 2, the fibers $F_{HR}$ making up heating element 22 may vary along their length, such that different areas of heater 12 have different heating effects. For example, a size, cross-sectional shape, and/or material consist of fibers $F_{HR}$ may vary across a face and/or depth of heater 12. This may allow for a temperature, a heat area, a heat concentration, and/or other characteristics of heater 12 to be customized for particular applications.

In some embodiments, one or more functional elements 28 may be discharged from head 14, along with the fibers $F_{HR}$ making up heating element 22. For example, prefabricated fiber strands passing through head 14 may include functional elements 28 that are electrically connected between sequential sections of the fibers strands. These functional elements 28 may include, for example, resisters, capacitors, light-emitting diodes (LED), RFID tags, switches, sensors, batteries, fuses, filters (e.g., low-pass filters), interrogators, etc. Functional elements 28 may then pass through a nozzle of head 14, along with the connected fiber strands and, thereby, become an integral portion of heating element 22. Information gathered via functional elements 28 may be used (e.g., by control mechanism 24) to adjust the current flowing through heating element 22 and thereby an amount of heat, heat intensity, heat location, heat duration, etc. produced by heater 12.

Control mechanism 24 may be used to selectively complete a circuit between the leads in base 20 and power source 26. In one embodiment, control mechanism 24 is an analog device that is moveable by a user between two or more predefined settings (e.g., between on- and off-settings) to complete the circuit in a desired manner. In other embodiments, control mechanism 24 is a digital device configured to responsively adjust the power setting based on a manual set point (e.g., a desired temperature) and an actual output (e.g., an actual temperature or power discharge, as detected by functional element 28) of heater 12. In yet another embodiment, control mechanism 24 may include a processor having means for automatically regulating an operation of heater 12.

Unlike the embodiment of FIG. 2, where the current is directly applied to the circuit of high-resistance fibers $F_{HR}$ to cause the fibers to generate heat, the current may be induced within heating element 22 of FIG. 3. In particular, head 14 of FIG. 3 may include an electro-magnetic current inducer (EMCI) 30. EMCI 30 may be a powerful, high-frequency electromagnet that is connected with control mechanism 24 via the low-resistance fibers $F_{LR}$ described above. In one embodiment, EMCI 30 is a prefabricated component assembled into base 20 during fabrication of heater 12. In another embodiment, EMCI 30 is fabricated in-situ by head 14. For example, EMCI 30 may include low-resistant fibers (e.g., copper wires) that are discharged via head 14 into coils and coated with the heat-insulating matrix $M_I$ during fabrication of base 20.

With this configuration, an application of current to the coils (e.g., from power source 26 via control mechanism 24 and the leads described above) may cause a high-frequency magnetic field to be generated that passes through heating element 22. This magnetic field induces an electric current in the fibers of heating element 22, which generates heat due to the resistance of the fibers. By controlling a strength of the electromagnetic field, the amount of heat being generated in the high-resistance fibers $F_{HR}$ can varied in real time. It is contemplated that heater 12 of FIG. 3 could generate heat through a combination of directly applied current and induced current (e.g., via separate circuits, via continuous fibers and suspended particles, etc.), if desired.

INDUSTRIAL APPLICABILITY

The disclosed additive manufacturing system and method may allow for efficient and rapid fabrication of resistive- and inductive-type heaters, which can be customized on-the-fly to specific applications. The heaters may conform to any desired shape, and be rigid or flexible. The heaters may provide variable levels of heat in concentrated or distributed manners, with precision control that is based on feedback from embedded functional elements.

It will be apparent to those skilled in the art that various modifications and variations can be made to the disclosed additive manufacturing system and heater. Other embodiments will be apparent to those skilled in the art from consideration of the specification and practice of the disclosed additive manufacturing system and heater. It is intended that the specification and examples be considered as exemplary only, with a true scope being indicated by the following claims and their equivalents.

What is claimed is:

1. A heating element, comprising:
   a matrix material;
   an electrically and thermally conductive fiber that is at least partially encased in the matrix material; and
   an electrically conductive fiber that extends into the matrix material and connects with the electrically and thermally conductive fiber,
   wherein a resistance of the electrically and thermally conductive fiber is higher than a resistance of the electrically conductive fiber.

2. The heating element of claim 1, wherein the matrix material is a thermoset polymer.

3. The heating element of claim 1, wherein the electrically and thermally conductive fiber is continuous throughout the matrix material.

4. The heating element of claim 3, further including electrically and thermally conductive particles suspended in the matrix material.

5. The heating element of claim 1, wherein the electrically and thermally conductive fiber includes only particles suspended in the matrix material.

6. The heating element of claim 1, wherein the matrix material has a porosity less than about 60%.

7. The heating element of claim 1, wherein:
   the electrically and thermally conductive fiber is a first fiber; and
   the heating element further includes a second electrically and thermally conductive fiber that is at least partially encased in the matrix material and connected to the electrically conductive fiber.

8. The heating element of claim 7, wherein:
   the first fiber forms a first circuit; and
   the second electrically and thermally conductive fiber forms a second circuit.

9. The heating element of claim 7, wherein:
   the first fiber is joined serially with the second electrically and thermally conductive fiber; and the second electrically and thermally conductive fiber has at least one of a diameter, cross-sectional shape, and material consist that is different from the first fiber.

10. The heating element of claim 9, further wherein the first fiber is joined with the second electrically and thermally conductive fiber via a solder paste.

11. A composite heater, comprising:
a base additively manufactured from a first matrix material;
a heating element additively manufactured adjacent the base from a second matrix material and an electrically and thermally conductive fiber that is at least partially encased in the second matrix material; and
a control mechanism configured to selectively complete a circuit between a power supply and the electrically and thermally conductive fiber.

12. The composite heater of claim 11, wherein a thermal conductivity of the first matrix material is lower than a thermal conductivity of the second matrix material.

13. The composite heater of claim 12, wherein:
the first matrix material has a porosity greater than about 60%; and
the second matrix material has a porosity less than about 60%.

14. The composite heater of claim 12, wherein the electrically and thermally conductive fiber is continuous throughout the second matrix material.

15. The composite heater of claim 14, further including electrically and thermally conductive particles suspended in the second matrix material.

16. The composite heater of claim 12, wherein the electrically and thermally conductive fiber includes only particles suspended in the second matrix material.

17. The composite heater of claim 11, wherein:
the base includes a recess; and
the heating element is disposed in the recess.

18. The composite heater of claim 11, wherein the base is additively manufactured from a continuous fiber that is at least partially encased in the first matrix material and formed into a lattice structure.

19. The composite heater of claim 11, wherein the base is additively manufactured from a continuous fiber that is at least partially encased in the first matrix material and formed into an electromagnet.

20. The composite heater of claim 11, wherein the first and second matrix materials are thermoset polymers.

* * * * *